H. BALL.
QUARTZ CRUSHER.
No. 85,354. Patented Dec. 29, 1868.
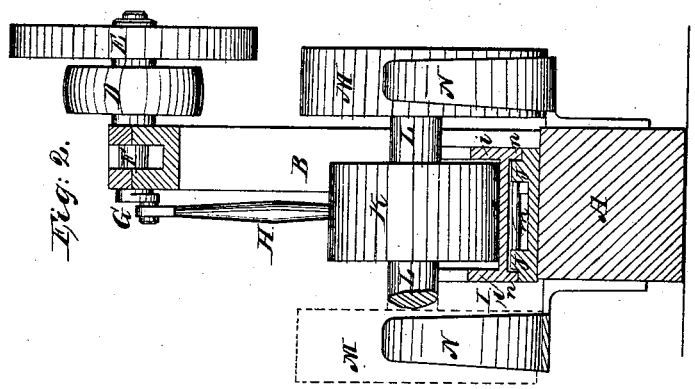
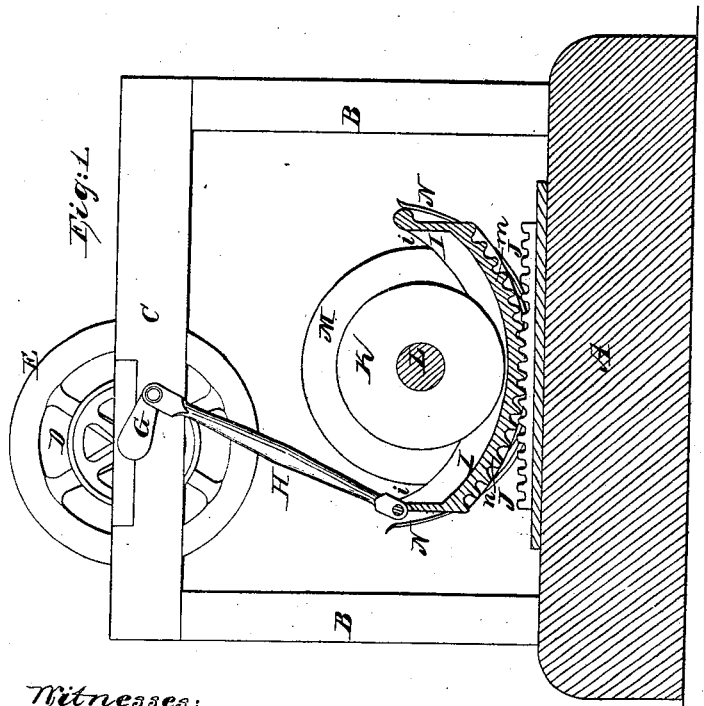
Witnesses:
Th. B. Deming
Wm. H. Brereton
Inventor:
Hosea Ball
by Knight Bros.
Attorneys

HOSEA BALL OF NEW YORK, N. Y.

Letters Patent No. 85,354, dated December 29, 1868.

IMPROVED QUARTZ-CRUSHER.

The Schedule referred to in these Letters Patent and making part of the same.

*To all whom it may concern:*

Be it known that I, HOSEA BALL, of the city, county, and State of New York, have invented a new and useful Improvement in Quartz-Crushers; and I do hereby declare the following to be a full, clear, and exact description thereof, reference being had to the accompanying drawings, which are made a part of this specification, and in which—

Figure 1 is a vertical section, at right angles to the shaft of the crusher, or the view may be termed an elevation, one of the auxiliary outer wheels, and one side of the pan being removed to expose other parts to view.

Figure 2 is a vertical section through the centre of the crusher-shaft.

In this machine the crushing-roller has a reciprocating rotary motion in a pan, which rocks beneath it in the same plane of motion. On an extension of the crusher-shaft are heavy wheels, which add their gravity to the effective force of the crusher, and have two other functions: they prevent the careening of the roller, and, by contact with recoil springs, aid in initiating the return-motion.

The actuating-mechanism may be attached to the pan, which is rocked thereby, causing the crushing-roller to rotate as its bed tips, or it may be attached to the shaft of the roller, which tips the pan by contact therewith.

The pan has a segment-rack on the bottom, which meshes into racks on the sill, so as to preserve the pan from shifting as it is rocked.

In the drawings—

A is the sill-piece, upon which the machinery is supported.

B B are standards, supporting the beam C, to which the driving-apparatus is connected.

This apparatus is represented as a band-wheel, D, fly-wheel E, shaft F, and crank G, the latter connected by a pitman, H, to the end of the pan I, so as to rock the latter when the crank revolves, and thereby impart a rotary reciprocating motion to the crushing-roller K.

For this combination of devices for rocking the pan, other means may be substituted, such as connecting a pitman from the cross-head of a reciprocating steam-engine to the end of the pan.

I have also adopted another plan, and, in some cases, prefer to use it, that is, connecting the pitman from the motor to the shaft of the roller K itself, so as to make the roller the cause of motion of the rocking-pan, instead of the converse arrangement, as shown in the figures.

The pan I is an annular segment, having flanges *i i*, which form ledges, to retain the material placed in the pan, excepting as the lighter portions may be flowed over by the water, as will be explained presently, when treating of the operation.

The under surface of the pan has a series of corrugations, *m*, which act as teeth, meshing into those of the racks J J, on the sill A. The mutual engagement of these teeth causes the pan to keep in its proper position on the bed.

The teeth on the pan are depressed below the general surface of the pan-bottom, leaving flanges *n* at the edges of the pan, which bear against the ends of the rack-teeth, if any lateral deviation occur.

By the meshing of the cogs on the pan and racks, the displacement of the pan in one direction is avoided, and, by the bearing of the flanges on the outer and under edges of the pan against the ends of the rack-teeth, the lateral displacement of the pan is prevented.

The roller K has a breadth proportionate to the width of the pan, and its axis L is prolonged on both sides, so as to receive weighted wheels M, which add to the crushing-force of the roller K.

The wheels M give steadiness to the motion of the roller, and, by distributing the weight over a greater length of axis, they prevent its being readily tipped or careened by the resistance of the blocks of material fed between the roller and its bed in the pan.

N are springs, against which the wheels strike, and which tend to give the roller an impulse in the other direction, so as to initiate its return-movement.

The form and character of these springs will vary with the size and proportions of the other parts, being of such a character as to receive the impact advantageously.

For these springs, pivoted levers may be substituted, the wheels colliding with them, and raising a weight, whose fall initiates the return-movement.

Operation.

The quartz or other metalliferous rock is reduced to a convenient size, depending upon the size of the wheels and the character of the rock, and is then fed into the pan by means of a shovel, in small quantities at a time, and frequently. The reciprocation of the heavy roller, causes it to traverse on the rock placed between it and the surface of the pan, and to crush the rock, while a continuously-flowing stream of water constantly removes the non-metalliferous portion, as it becomes reduced to a fine sand, leaving the heavier metallic particles in the pan, to be removed at intervals, as they accumulate.

In removing the metal, the roller is run to the end of the pan, while the other part is emptied, and, being then rolled to the other end, the remaining metal is removed.

The requisite proportions of the machine need not be specifically stated, as they will depend upon the scale desired, the amount of work the machine is destined to execute, and the character of rock under treatment.

Should the bed or pan be made an entire circle, instead of an annular segment, the teeth on the bottom might in that case be dispensed with.

The position of the rocker, relatively to the sill or platform, is maintained by the engagement of the teeth on the rocker and sill respectively, as described; and this has the further effect of maintaining the roller and its shaft in proper relation to the driver, when that is connected to the shaft.

The roller is very heavy, and naturally seeks its bed in the lowest part of the pan, for the time being, when the pan is primarily rocked, and, should the pan shift its position, its connection to the driver is thrown out of proper relation.

Having described my invention,

What I claim therein as new, and desire to secure by Letters Patent, is—

1. The rocking pan I, supported from beneath, in combination with the reciprocating roller K, traversing said pan, and provided with weights M, substantially as described.

2. The combination and arrangement of the stationary rack J, the rocking pan I, with teeth or corrugations $m$ on its bottom, and the reciprocating roller K, substantially as and for the purpose described.

3. The springs N, so arranged as, by contact with the roller or wheels, to arrest the motion of the roller, and assist its return-movement, substantially as described.

To the above specification of my invention I have signed my hand, this 31st day of August, 1868.

HOSEA BALL.

Witnesses:
EDWARD H. KNIGHT,
WM. H. BRERETON.